July 8, 1958  A. J. IMMESOETE  2,842,078
DISK FERTILIZER APPLICATOR
Filed Oct. 14, 1955

INVENTOR.
ARTHUR J. IMMESOETE
ATTORNEYS

United States Patent Office 2,842,078
Patented July 8, 1958

2,842,078

DISK FERTILIZER APPLICATOR

Arthur J. Immesoete, Moline, Ill., assignor to Deere & Company, Moline, Ill., a corporation of Illinois Application October 14, 1955, Serial No. 540,439

2 Claims. (Cl. 111—85)

This invention relates generally to agricultural implements and more particularly to fertilizer-planter combinations, wherein means is provided for forming separate furrows for seed and fertilizer.

The object and general nature of the present invention is a provision of a fertilizer-planter furrow opener combination in which a furrow is formed in the soil to receive seed, followed by a fertilizer furrow opener so constructed and arranged that the fertilizer furrow opener forces quantities of soil into the furrow opened by the seed furrow opener, whereby the seed is adequately covered by soil even though the unit is operating in soil conditions where the furrow tends to remain open and is not entirely closed by the ordinary means employed for such purposes, such as press wheels and the like.

Unless seed deposited in the seed furrow is adequately covered by soil, the seed tends to dry out and germination is materially impaired. According to the principles of the present invention, I utilize the fertilizer furrow forming means and construct the same especially so as to act to force soil, displaced to form the fertilizer furrow, toward the seed furrow with a positive action so as to close the seed furrow under substantially all soil conditions.

More specifically, it is a feature of this invention to provide a fertilizer-planter combination in which the means for forming a fertilizer furrow follows the means forming the seed furrow and comprises a rotatable part, such as a disk, that is disposed between the seed furrow opener and the laterally outer plate of the fertilizer furrow forming means. Usually the seed furrow opener is in the nature of a runner, a non-rotatable part, and the outer plate of the fertilizer furrow forming means is also a non-rotating part, and disposing the rotatable disk between these parts results in better accommodation of trash and the like, which would be apt to become jammed in between two non-rotatable parts if the latter parts were disposed adjacent one another. Disposing the rotatable disk between these parts assures adequate trash clearance.

These and other objects and advantages of the present invention will be apparent to those skilled in the art after a consideration of the following detailed description, taken in conjunction with the accompanying drawings, in which.

The present invention is in the nature of an improvement in fertilizer-planter implements of the general type shown in U. S. Patent 2,033,366, issued March 10, 1936, to C. H. White. Such implements include a supply of seed and seed dispensing means that is so constructed and arranged as to deliver seed into a seed furrow opener unit 11 of the type including a generally hollow shank 12 to the lower end of which is fixed a furrow opener member in the form of a runner or shoe 13. The White type of implement also includes a supply of fertilizer and fertilizer dispensing means which delivers fertilizer material through a fertilizer tube.

Figure 1:
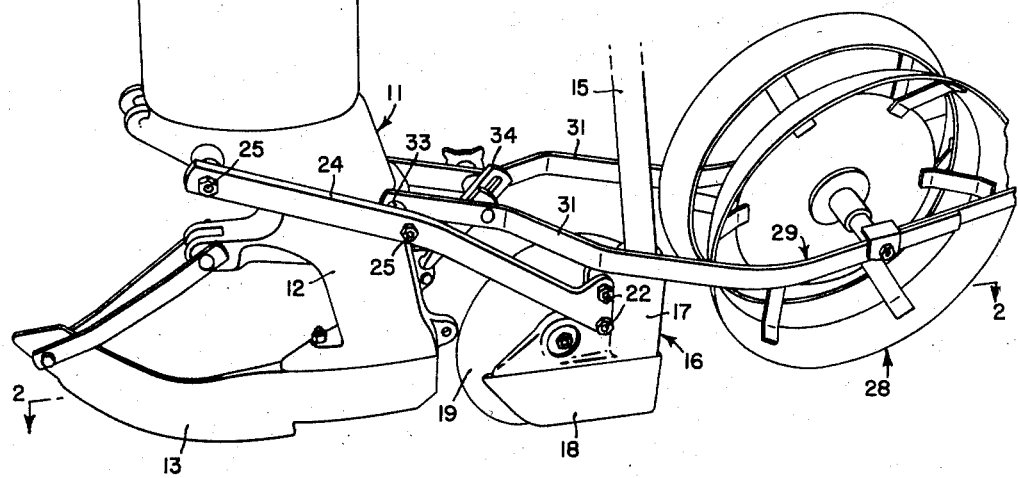
Fig. 1 is a perspective view of a portion of a fertilizer planter combination unit in which the principles of the present invention have been incorporated.

According to the principles of the present invention, I provide a fertilizer tube 15 and connect the lower end thereof to a fertilizer furrow opener 16 that is carried more or less rigidly by the shank 12 of the seed furrow opener unit 11. The fertilizer furrow opener unit 16 includes a fertilizer boot 17 that is hollow and forms a fertilizer conduit to which the lower end of the fertilizer tube 15 is connected in any suitable way. Secured to the lower end and forming a part of the fertilizer boot casting 17 is a runner plate 18 and a rotatable disk 19 mounted on the forward portion of the boot casting 17 by any suitable bearing means, indicated generally at 21. The fertilizer boot casting 17 is apertured to receive a pair of bolts 22 that secure the member 17 to the rear end of a supporting bar 24 that extends upwardly and forwardly to the shank 12 and is secured to the latter by bolts 25 in laterally outwardly spaced relation, as will be clear from Fig. 1.

Figure 2:
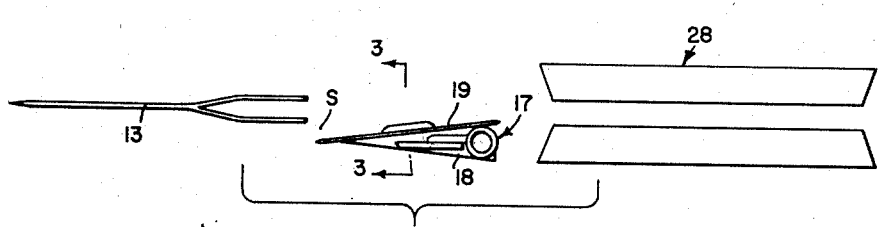
Fig. 2 is a sectional view taken generally along the line 2—2 of Fig. 1.

As will be seen from Fig. 2, the fertilizer furrow opening disk 19 is flat and is disposed in a generally vertical plane that extends at one side of the runner 13 in forwardly diverging relation with respect to the runner 13 while the generally vertical plane in which the fertilizer runner plate 18 is disposed lies in generally forwardly converging relation with respect to the runner 13. The disk 19, as well as the plate 18, is disposed rearwardly of the rear end or heel of the runner 13 a relatively small amount, and the disk 19 extends forwardly of the plate 18, and in so doing the disk 19 extends into the space S between the runner 13 and the plate 18. A press wheel 28 of generally conventional construction is connected to the shank 12 by a press wheel frame 29 that is made up of a pair of bars 31, the forward ends of which are adjustably connected to the shank 12 by any suitable means, such a pivot bolt 33 and an adjustable brace 34. As best shown in Fig. 2, one of the press wheel sections moves directly over the fertilizer furrow.

The operation of the device of the present invention is substantially as follows. As the seed furrow opener and fertilizer furrow opener are drawn along the ground in operating position, the runner 13 opens a seed furrow and the following fertilizer furrow opening unit 16 acts, by virtue of the angular relation of the disk 19, to force soil lying at one side of the seed furrow directly and with a positive action into the latter so as to cover seed deposited in the seed furrow while, at the same time, forming a fertilizer furrow into which fertilizer is deposited by being discharged downwardly through the fertilizer shank 17.

Figure 3:
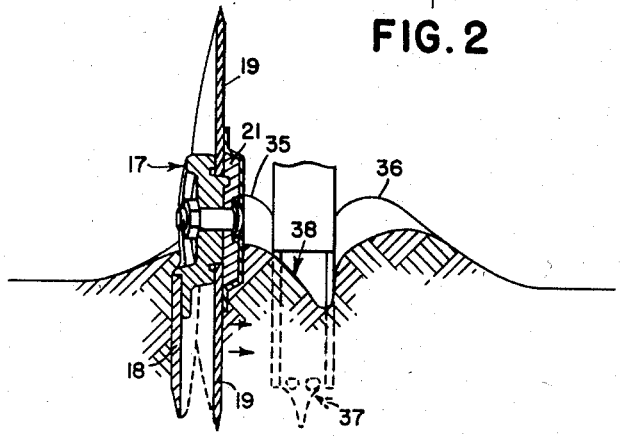
Fig. 3 is a fragmentary and partly diagrammatic sectional view taken generally along the line 3—3 of Fig. 2.

It will be noted, particularly from Fig. 3, that the disk 19 serves to force a major portion of the soil that is displaced to form the fertilizer furrow toward and/or into the seed furrow, thereby closing the latter to an extent sufficient to cover all of the seed therein and insure proper germination of the seed, even though the planting and fertilizing is done in sticky and other soil conditions under which the furrows opened by the units 11 and 16 may tend to remain open, especially in the lower portions thereof, even though the soil is pressed downwardly by the press wheel 28. Figure 3 is drawn to indicate the soil ridges 35 and 36 thrown up by the runner 13 to form the seed furrow 37, and the soil indicated at 38 represents that of the left hand ridge 35 that is displaced laterally to fill in the seed furrow after the passage of the disk 19. Thus, the action of the forwardly diverging disk 19 is to force the soil laterally toward the seed furrow so as to insure a complete coverage of the seed in the seed furrow, although the soil might be of such condition or consistency as to tend to remain open even after the passing of a press wheel over the seed and fertilizer furrows.

It will also be noted that the disk 19 lies between the non-rotatable plate 18 and the non-rotatable seed runner 13, and since the disk rotates it acts to clear trash and the like from between the members 13 and 18, whereas if these two non-rotatable parts were drawn through the soil with no rotatable ground engaging part between them, any trash and the like on the ground surface would tend to quickly ball up between the parts, and seed and/or fertilizer would not be properly covered.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In a fertilizer-planter combination, a first furrow opener comprising a non-rotatable part in the form of a soil penetrating runner, a second furrow opener comprising a non-rotatable soil penetrating plate disposed laterally outwardly of and closely adjacent the rear of said runner, and a rotatable disk mounted on said plate and extending forwardly thereof, the forwardly extended portion of said rotatable disk being disposed between said runner and said plate, and the rotation of said disk facilitating the passage of said furrow openers through trash and the like.

2. In a fertilizer-planter combination, a seed furrow opener comprising a relatively stationary runner, a fertilizer furrow opener comprising a relatively fixed plate spaced laterally and rearwardly of said runner and a furrow-opening disk mounted for rotation on said fixed plate and disposed between said plate and runner so as to extend forwardly of said plate substantially to a point adjacent but spaced laterally outwardly of the rear portion of said runner, whereby the fertilizer furrow opener is disposed closely behind the seed furrow opener, said furrow-opening disk being arranged in forwardly diverging relation with respect to said runner so as to open a fertilizer-receiving furrow and move soil over into the furrow opener by said runner, a press wheel frame connected with said seed furrow opener and extending rearwardly beyond said fertilizer furrow opener, and a press wheel carried by said frame closely behind said disk and plate.

References Cited in the file of this patent

UNITED STATES PATENTS

| | | |
|---|---|---|
| 1,868,731 | Drennan | July 26, 1932 |
| 2,341,795 | Kriegbaum et al. | Feb. 15, 1944 |

FOREIGN PATENTS

| | | |
|---|---|---|
| 9,933 | Great Britain | of 1900 |